(12) United States Patent
Spengler

(10) Patent No.: US 6,524,506 B2
(45) Date of Patent: Feb. 25, 2003

(54) COMBINATION TOOL FOR EDGE-FOLDING AND CUTTING A PANEL RIM

(75) Inventor: Gerhard Spengler, Frankfurt (DE)

(73) Assignee: R+S Technik GmbH, Offenbach am Main (DE)

( * ) Notice: Subject to any disclaimer, the term of this patent is extended or adjusted under 35 U.S.C. 154(b) by 121 days.

(21) Appl. No.: 09/749,123

(22) Filed: Dec. 26, 2000

(65) Prior Publication Data

US 2002/0078804 A1 Jun. 27, 2002

(51) Int. Cl.⁷ ................................................ B29C 17/04
(52) U.S. Cl. ........................ 264/163; 425/292; 425/304; 83/562; 83/583; 83/641
(58) Field of Search ............................... 425/302.1, 292, 425/304; 264/163; 83/592, 562, 641, 583, 823

(56) References Cited

U.S. PATENT DOCUMENTS

| | | | | |
|---|---|---|---|---|
| 3,193,367 A | * | 7/1965 | Giffen ......................... 425/292 |
| 3,869,975 A | * | 3/1975 | Seewer ......................... 425/304 |
| 4,129,636 A | * | 12/1978 | Boden et al. ............. 264/328.6 |
| 4,471,679 A | | 9/1984 | Spengler ....................... 83/529 |
| 4,519,766 A | | 5/1985 | Spengler ................... 425/302.1 |
| 4,923,539 A | | 5/1990 | Spengler et al. ............... 156/79 |
| 5,076,880 A | | 12/1991 | Spengler et al. ............. 156/382 |
| 5,324,384 A | | 6/1994 | Spengler ....................... 156/581 |
| 5,718,791 A | | 2/1998 | Spengler ....................... 156/212 |
| 5,759,594 A | * | 6/1998 | Masui et al. ................. 156/268 |

\* cited by examiner

*Primary Examiner*—Jan H. Silbaugh
*Assistant Examiner*—Joseph S. Del Sole
(74) *Attorney, Agent, or Firm*—W. F. Fasse; W. G. Fasse

(57) ABSTRACT

A combined tool for edge-folding and trimming a rim of a panel includes a cutting blade rigidly secured to a tool holder frame, an edge-folding tool slidably received in the tool holder frame, and a biasing spring arranged in the tool holder frame to bias the edge-folding tool outwardly away from the holder frame. The tool is moved in a linear stamping direction, whereby the edge-folding tool folds back and then holds and compresses a margin of a panel workpiece. The tool holder frame and cutting blade are pushed farther in the linear stamping direction, while the edge-folding tool is pushed back into the tool holder frame and compresses the biasing spring, whereby the cutting blade cuts through and compresses the panel workpiece. This forms a back-folded, compressed, and trimmed rim of the finished panel in a single work step using an integrated edge-folding and cutting tool.

21 Claims, 1 Drawing Sheet

COMBINATION TOOL FOR EDGE-FOLDING AND CUTTING A PANEL RIM

FIELD OF THE INVENTION

The invention relates to tools for folding an edge of a molded or laminated panel for forming a panel rim, and cutting or trimming excess material from the rim. The tool is particularly suitable for use during the molding and laminating process for fabricating interior trim components for motor vehicles.

BACKGROUND INFORMATION

Interior trim panels for motor vehicles and the like are typically fabricated by laminating and molding a cover sheet material, such as a fabric, vinyl, imitation leather, or the like onto a supporting substrate, such as a substrate of plastic, synthetic composite, or a hybrid composite including natural materials as well as synthetic materials. Generally, the cover sheet and the substrate are thermo-formable, i.e. may be heated to a softening or molding temperature, are then molded into a desired contoured shape, and then rigidify to maintain the contoured shape upon cooling.

Due to tolerances and misalignments that arise during the molding and laminating process, and due to the stretching and molding deformation to which the cover sheet and the substrate are subjected, the cover sheet must typically be initially provided with oversized dimensions relative to the finished size of the resulting laminated panel. For this reason, it is necessary to cut or trim the excess cover sheet material along the edges of the cover sheet after the laminated and molded panel has been completed. Various apparatus and methods are known for automatically or semiautomatically carrying out such cutting or trimming of the excess cover sheet material along the edges of a molded panel. For example, see U.S. Pat. Nos. 5,076,880; 4,923,539; 4,519,766 and 4,471,679 in this regard.

Generally, a stamping knife or cutting blade is carried by a tool holder which in turn is actuated by a piston cylinder device or the like. The piston cylinder device is actuated to press the cutting blade against the excess cover sheet material along an intended trimming line, in order to thereby stamp-cut the cover sheet material along this intended trimming line. The cutting blade may cooperate with a stamp cutting counter surface or anvil surface on the opposite side of the cover sheet material, in order to carry out the stamp cutting.

Even after the excess cover sheet material has been cut away around the edge or rim of the substrate and the finished laminated panel, there has been a demand for a higher quality finish at the edge or rim of the panel. Namely, the cut edge of the cover sheet is subject to fraying or delamination or the like if it is left exposed directly at the edge or rim of the panel, and in any event is not visually attractive if it can be seen from the decorative front side of the finished panel.

For these reasons, it has become known to fold the edge of the cover sheet material back around a rim of the substrate, or to fold back the cover sheet and the substrate together to form a rim of the panel. In this manner, the actual edge of the cover sheet is hidden and protected against fraying or delamination, because it is folded and laminated around the rim of the substrate onto a back surface thereof. In this context, please see U.S. Pat. Nos. 5,718,791 and 5,324,384.

According to the general conventional practice and knowledge in the art, the cover sheet edge may be edge-folded by at least 90° around the panel rim, or the cover sheet and substrate may be folded back together by at least 90°, in order to cover and thereby hide the edge of the cover sheet. Once the finished panel is installed in the interior of a motor vehicle or the like, the rim of the panel will be securely held against other components of the motor vehicle, so that the back-folded edge of the cover sheet will be completely hidden and enclosed. The 90° edge-folding process can be carried out in substantially one working operation, or an immediate succession of steps in a single molding apparatus, whereby the cover sheet material and the substrate are laminated together, molded into the intended contoured shape, and then edge-folded to form the panel rim.

While the prior art has provided the edge cutting or trimming methods and apparatus as described above, as well as the edge-folding methods and apparatus as described above, the prior art has not provided a satisfactory manner of combining the edge-cutting and the edge-folding. Namely, after a cover sheet edge (either with or without the substrate) has been edge-folded back to form the panel rim as described above, there still exists an excess margin of cover sheet material along the edge of the cover sheet that has been folded back around the panel rim.

Thus, after the molded, laminated and edge-folded panel has been substantially completed, the excess margin material must be trimmed off in a subsequent manual or mechanical step. This requires considerable extra effort, even if the edge-trimming is carried out mechanically using a suitable stamp-cutting tool. Particularly, it is considerably difficult to properly align the molded and laminated panel in a mechanical cutting or trimming station and then to secure the panel into exactly the correct registered position so that the cutting blade or blades will accurately trim off the excess margin material along the intended trimming line. Even with great care being exercised in this step, unavoidable misalignment of the panel, and particularly the edge-folded rim thereof, relative to the cutting tool results in miscutting of some panels which must then be rejected and scrapped. The additional effort and steps required for carrying out the edge-cutting after the edge-folding also slow down the throughput of a panel forming apparatus, which in turn increases the cost of production. Furthermore, the provision of separate edge-folding and edge-cutting tools or work stations significantly increases the size, complexity and cost of the overall panel manufacturing apparatus.

Attempts have been made to combine an edge-folding plunger with a cutting blade in order to carry out the edge-folding and the edge-cutting in a single operation. However, such attempts have suffered substantial difficulties. For example, if the cutting blade is rigidly fixed to the edge-folding tool or plunger so as to form a single integral unit thereof, unsatisfactory results are obtained. During the pre-forming or molding process, the cover sheet and the substrate material are stretched, deformed, and placed under tension. If an edge-cutting blade and the edge-folding plunger are rigidly integrated into a single unit, as this integrated unit is pressed against the cover sheet edge to carry out the edge-folding and edge-cutting, the cutting blade will cut into the cover sheet material, which is under tension, as the edge-folding and molding process is carried out. The cutting blade will penetrate entirely through the tensioned material and cut it off in its tensioned state before the edge-folding process has been completed, i.e. before the edge-folding plunger has completely pressed the cover sheet and substrate material layers into their finished edge-folded condition. For this reason, the cover sheet would always be cut shorter than the substrate, since the cutting blade cuts through the cover sheet while it is under tension during or even before the edge-folding process has been carried out. When the integrated tool is retracted, the cover sheet, which was cut under tension, will have a tendency to shrink back, whereby the cut edge of the cover sheet might even shrink around the folded-back edge or rim of the substrate and be physically exposed at that location.

SUMMARY OF THE INVENTION

In view of the above, it is an object of the invention to provide an integrated or combined tool that can carry out edge-folding and edge-cutting of a panel rim of a laminated panel in substantially a single operation and a single work station. It is a further object of the invention to provide such a tool that can achieve a high quality edge-folded and trimmed panel rim of a laminated panel with a very simple and economical structure and operation. The invention further aims to avoid or overcome the disadvantages of the prior art, and to achieve additional advantages, as apparent from the present specification.

The above objects have been achieved according to the invention in a combination tool for edge-folding and cutting a panel rim, wherein the tool comprises a tool holder frame, a cutting and compressing blade rigidly secured to the tool holder frame and an edge-folding tool or plunger that is movably connected to or arranged in the tool holder frame. Thereby, the edge-folding tool is slidably movable relative to the cutting and compressing blade. Preferably, the edge-folding tool is biased by a biasing device to protrude outwardly away from the tool holder frame, for example by a compression spring, a stack of cupped disk springs, a repulsion magnet arrangement, a hydraulic or pneumatic piston-cylinder device, elastomeric members, or the like. The edge-folding tool can be pressed against the biasing force, for example the spring force, to be slidingly retracted into the tool holder frame while moving parallel to and sliding directly along the longitudinal extension of the cutting and compressing blade. A receiving chamber or hollow space within the tool holder frame receives the edge-folding tool as it is retracted, and provides a parallel sliding guidance for the edge-folding tool. In a neutral starting position, the working face or stamping face of the edge-folding tool protrudes forwardly from the tool holder frame to a greater extent or beyond the cutting edge of the cutting and compressing blade.

With the above construction, the inventive tool operates as follows. In a prior molding and laminating operation, a cover sheet has been laminated onto a substrate, the cover sheet and substrate together have been compressed and molded between an upper form and a lower form, and a clamping slip frame or tentering frame has pulled the excess margin of the cover sheet and the substrate beyond the area at which an edge-folded rim is to be formed. Then, the present inventive tool is moved from its initial position toward the rim area of the cover sheet and substrate. As the tool, and particularly the tool holder frame is moved forward in a linear stamping direction, the stamping face of the edge-folding tool first contacts the excess margin of the cover sheet and substrate materials, and compresses these materials against the lower mold. At this point, the cutting and compressing blade has not yet contacted the cover sheet and the substrate.

As the tool holder frame is moved further in the linear stamping direction, after the edge-folding tool has compressed the margin area of the cover sheet and the substrate, the edge-folding tool will progressively be pushed into the tool holder frame against the biasing spring force. Then, the cutting edge of the cutting and compressing blade touches and penetrates into the cover sheet and the substrate, while the stamping face of the edge-folding tool remains pressed against the cover sheet and substrate.

Preferably, the linear stamping direction is oriented at an acute angle relative to the 90° edge fold or rim to be formed, and the cutting edge of the cutting and compressing blade is tapered at the same angle. Thereby, the tapered compressing face of the blade compresses the rim of the panel as the cutting edge penetrates through the cover sheet and the substrate against the cutting counter surface to complete the cut.

Advantageously according to the invention, the edge-folding tool has completely folded and compressed the cover sheet and the substrate against the corresponding mold surfaces of the lower mold before the cutting blade cuts into and through the cover sheet and the substrate. Although the edge-folding tool and the cutting blade are integrated into a single combined tool that carries out a single linear stamping motion, the edge-folding and stamping tool carries out its work before the cutting blade.

Thereby, the present invention avoids the above described undesirable cutting of the cover sheet while it is being deformed, compressed, and tensioned by the edge-folding stamp.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
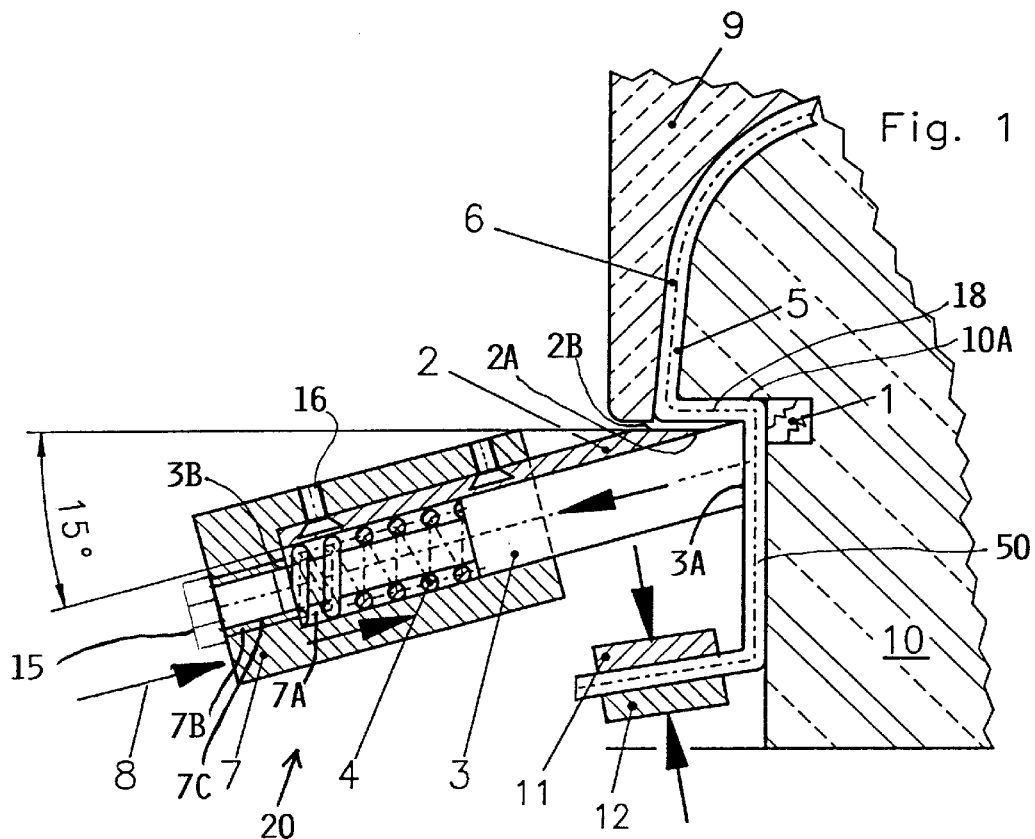
FIG. 1 is a schematic cross-section of a combined edge-folding and cutting tool according to the invention in a first stage in which the edge-folding tool compresses the panel margin.

As shown in FIG. 1, a combined edge-folding and cutting tool 20 according to the invention includes a tool holder frame 7 that has a receiver cavity or chamber 7A therein. The tool 20 further includes a cutting and compressing blade 2 that is received in the receiver cavity 7A and rigidly secured to the tool holder frame 7, for example by screws or bolts 16. Alternatively, pins, studs, clamps or rivets or the like could be used to rigidly secure the cutting and compressing blade 2 to the tool holder frame 7. Preferably, the securing means such as screws or bolts 16 are removable so that the blade 2 can be exchanged as needed.

The combined tool 20 further includes an edge-folding stamp or tool 3 that is slidably received in the receiver cavity 7A of the tool holder frame 7. The receiver cavity 7A also forms a parallel sliding guidance for the edge-folding tool 3, so that the edge-folding tool 3 can guidedly slide in and out of the receiver cavity 7A in a direction parallel to the longitudinal extension or plane of the cutting or compressing blade 2. Preferably, the edge-folding tool directly contacts and slides against one side face of the cutting blade 2. A rod-like protrusion 3B of the edge-folding tool 3 may be slidingly received in a cylindrical bore 7B extending from the receiving chamber 7A. A cylindrical slide bearing sleeve 7C may be provided in the bore 7B to receive the rod-like protrusion 3B of the tool 3. This structure provides a positive parallel sliding guidance for the tool 3.

A biasing device, here particularly a compression spring 4, is arranged in the receiving chamber 7A between an end wall thereof and an end face or shoulder of the edge-folding tool 3. Thereby, the compression spring 4 biases the tool 3 to protrude outwardly from the tool holder frame 7. On the other hand, the tool 3 is retained in the tool holder frame 7 by any suitable means, for example by a set screw engaging a groove in the tool 3, or by a protruding rim of the tool holder 7 reaching behind a protruding rim of the tool 3, or the like. While these retaining structures are not shown in detail, they can be embodied according to any conventional retaining structure.

FIG. 1 further schematically illustrates an adjusting bolt 15 which can be used to adjust the pre-biasing force exerted by the compression spring 4 against the tool 3. In the illustrated embodiment, the bolt 15 may be a hollow sleeve bolt that forms the above mentioned bearing sleeve 7C in the bore 7B for receiving the rod-like protrusion 3B of the tool 3. Any other configuration of an adjusting means for adjusting the pre-biasing force of the spring 4 may be provided, according to any conventional teachings in this regard.

In the stage of a panel molding process shown in FIG. 1, a cover sheet 6 has been laminated onto and molded with a substrate 5 between an upper mold 9 and a lower mold 10. An edge margin 50 of the cover sheet 6 and substrate 5 protrudes from the molding gap between the upper mold 9 and the lower mold 10, and is held under tension in a clamping slip frame or tentering frame including an upper clamp frame 11 and a lower clamp frame 12 holding the margin 50 therebetween. The lower mold 10 includes an undercut shoulder or recessed shoulder at which the panel rim 18 is to be formed. A cutting counter surface or anvil 1 of plastic (e.g. nylon), or a soft metal (e.g. brass) extends along this undercut shoulder 10A of the lower mold 10.

It is not shown in FIG. 1, but the combined tool 20 is carried by any suitable carrier and actuator construction, for example a hydraulic or pneumatic piston cylinder device mounted on a machine frame. The piston cylinder device is adapted to move the combined tool 20 in a linear stamping direction 8 relative to the upper and lower molds 9, 10. Preferably, the linear stamping direction 8 is oriented at an acute angle relative to the undercut shoulder 10A of the lower mold 10, against which the panel rim 18 is to be formed. The reason for this will be described below.

FIG. 1 shows a working position of the tool 20 in which the edge-folding has already begun. Prior to that position, the tool 20 was retracted farther toward the left of FIG. 1, and the margin 50 of the cover sheet 6 and substrate 5 was protruding substantially straight downwardly from the mold gap between the upper mold 9 and the lower mold 10, to the clamping slip frame 11, 12. Then, to get into the position shown in FIG. 1, the above mentioned actuator (not shown) moves the combined tool 20 in the linear stamping direction 8. At first, the entire tool 20 including the tool holder frame 7, the edge-folding blade 3, and the cutting and compressing blade 2 move in unison in the linear stamping direction 8. Once the stamping face 3A of the edge-folding tool 3 contacts the cover sheet 6, it pushes the cover sheet 6 and substrate 5 toward the right and upwardly toward the undercut shoulder 10A of the lower mold 10. In this manner, the tool 3 initiates the edge-folding.

After the cover sheet 6 and substrate 5 have been pressed against the lower mold 10, the edge-folding tool 3 compresses the margin 50 against the lower mold 10 with a prescribed stamping force that is determined by the prebiasing force exerted by the spring 4. At this point, the cutting blade 2 has not yet contacted the cover sheet 6. The entire tool continues to move in unison until the cover sheet 6 and substrate 5 have been compressed against the lower mold 10 to such an extent that the compressed cover sheet and substrate exert a sufficient reactive force on the edge-folding tool to overcome the spring biasing force. This causes the edge-folding tool 3 to retract into the tool holder frame 7 while compressing the spring 4, as the tool holder frame 7 and cutting blade 2 continue to move toward the lower mold 10. Namely, the actuator (not shown) exerts a greater force than the prescribed stamping force, i.e. the prebiasing force of the spring 4, so that the tool holder frame 7 and the cutting and compressing blade 2 rigidly secured thereto will continue to move in the linear stamping direction 8 as the edge-folding tool 3 remains stationarily pressed against the cover sheet 6, substrate 5 and lower mold 10. This is the state shown in FIG. 1. Note that the cutting and compressing blade 2 has not yet contacted the cover sheet 6. It is clear that in this state the stamping face 3A of the edge-folding tool 3 protrudes farther than the cutting edge 2A of the blade 2 away from the tool holder frame 7.

Next, the stamping actuator continues to move the tool holder frame 7 and the cutting and compressing blade 2 in the linear stamping direction 8, while the edge-folding tool 3 is pressed or retracted correspondingly further into the tool holder frame 7 with a consequent further compression of the spring 4. The resulting effect is that the cutting and compressing blade 2 slides relative to the edge-folding tool 3, or vice versa, in the linear stamping direction 8, until the cutting edge 2A of the blade 2 protrudes farther than the stamping face 3A of the edge-folding tool 3. At this point, the cutting edge 2A pierces into the cover sheet 6 and the substrate 5 until it reaches the cutting counter surface or anvil 1 and thereby has cut entirely through the cover sheet 6 and substrate 5. At the same time, the compressing face 2B formed by the tapered grind of the cutting edge 2A presses effectively upwardly so as to compress the cover sheet 6 and substrate 5 against the undercut shoulder 10A of the mold 10, for forming a tightly crimped or compressed panel rim 18 directly along the cut line at which the cutting edge 2A pierces through the cover sheet 6 and substrate 5.

Figure 2:
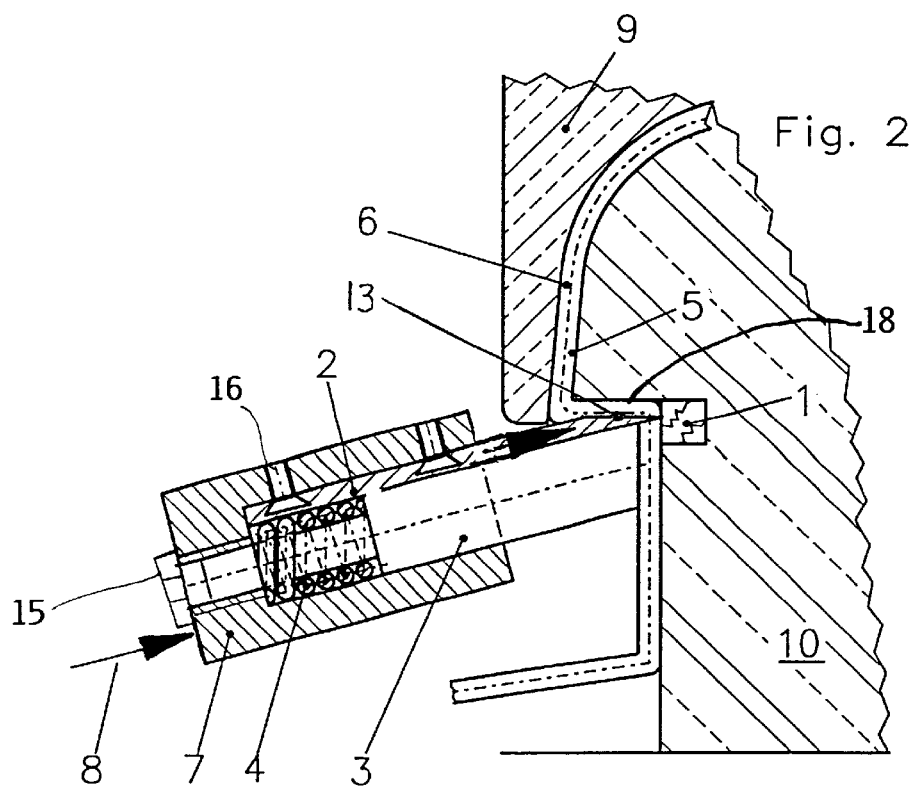
FIG. 2 is a schematic cross-sectional view similar to that of FIG. 1, but showing a later stage of the edge-folding and cutting process, in which the cutting blade is cutting through the cover sheet and the substrate.

In both the state shown in FIG. 1 and the state shown in FIG. 2, the stamping face 3A is considered to be proximate to the cutting edge 2A. This is intended to mean that the stamping face 3A and cutting edge 2A are within a range of distance apart from each other, or precisely aligned within that range, as defined between the maximum protruding position of the edge-folding tool (wherein the stamping face protrudes farther than the cutting edge) and the maximum retracted position of the edge-folding tool (wherein the cutting edge protrudes farther than the stamping face).

As can be seen especially in FIG. 1, the taper angle of the cutting edge 2A, which is defined as the angle between the tapered compressing face 2B and the major back surface of the blade 2 or the major plane along which the blade 2 longitudinally extends, is preferably an acute angle, such as 15°. Generally, this angle may be in the range from 10 to 35°, for example. This angle preferably corresponds to the acute angle at which the linear stamping direction 8 intersects with the undercut shoulder 10A or generally the edge-folded rim of the panel. Thereby, the above mentioned compressing effect of the compressing face 2B of the blade 2 pressing the cover sheet and substrate against the undercut shoulder 10A is achieved. The above mentioned preferred angle and angular range achieve a good balance of the force components for compressing and holding the margin 50 of the cover sheet 6 and substrate 5 with the stamping face 3A of the edge-folding tool 3, while then cutting through the cover sheet 6 and substrate 5 with the cutting edge 2A along a cut line, and finally compressing the panel rim 18 with the compressing face 2B of the cutting blade 2 against the undercut shoulder 10A, for forming the back-folded or under-folded rim 18 of the finished panel. Particularly, in the illustrated embodiment, the edge-folding forms a rim 18 that is folded at substantially 90° relative to adjoining portion of the main body of the finished panel.

After the position shown in FIG. 2, the tool 20 is again retracted toward the left directly opposite the linear stamping direction 8, whereby first the blade 2 is retracted from the workpiece, while the edge-folding tool 3 continues to press against and hold the severed margin 50 as the spring 4 expands and pushes the tool 3 out of the tool holder frame 7. Finally, the edge-folding tool 3 comes to its maximum extended or protruding position relative to the tool holder frame and will then also be pulled back together with the tool holder frame, away from the workpiece 5, 6, and clear of the molds 9 and 10. Then the severed margin 50 can be taken away, and the molds can be opened to remove the finished panel with its edge-folded, compressed, and trimmed rim 18.

Due to the structure and operation of the present inventive tool 20, the rim 18 is cleanly and precisely cut without undesired differential shrinking or shifting of the cover sheet 6 relative to the substrate 5. Namely, the cutting is only carried out by the cutting edge 2A after the material of the margin 50 directly along the intended cut line has been completely folded back and firmly compressed and held by the stamping face 3A of the edge-folding tool 3, and is continuously compressed and held throughout the cutting process. Moreover, the tapered compressing face 2B of the cutting blade 2 additionally contacts and compresses the edge-folded surface 13 of the remaining edge-folded rim 18 of the panel as the cutting is carried out. This forms a clean, stiff, precisely trimmed edge-folded rim 18, for example with an edge-fold of 90°. The present tool is especially suitable for edge-folding and trimming the rims of interior trim panels and other trim components in motor vehicles, such as interior door panels, consoles, dashboards, and the like.

In the illustrated embodiment, both a cover sheet 6 and a substrate of the panel are together folded back and then cut off along the edge of the formed rim. It is alternatively possible to use the inventive tool to edge-fold only the cover sheet over a rim of the substrate, and to cut only the cover sheet along the edge of that rim. This distinction is simply a matter of the intended design of the finished trim panel and the particular application of the inventive tool.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of using a combination tool to edge-fold and cut a rim of a panel being formed on a mold, wherein the combination tool includes:

a tool holder frame;

a cutting blade that is fixedly secured to said tool holder frame so as to be immovable relative to said tool holder frame, and that includes a blade body and a cutting edge protruding away from said tool holder frame;

an edge-folding tool that is movably mounted to said tool holder frame so as to be linearly slidable relative to said tool holder frame in a linear stamping direction, and that includes an edge-folding tool body and a stamping face protruding away from said tool holder frame proximate to said cutting edge; and a biasing device that is interposed between said tool holder frame and said edge-folding tool to apply a biasing force between said tool holder frame and said edge-folding tool which urges said edge-folding tool to protrude away from said tool holder frame in said linear stamping direction; and wherein the method comprises the following steps:

a) positioning said combination tool relative to said mold at an initial position in which said edge-folding tool is maximally protruding from said tool holder frame;

b) moving said tool holder frame toward an edge margin of said panel and said mold in said linear stamping direction, whereby said cutting blade and said edge-folding tool move with said tool holder frame in said linear stamping direction;

c) contacting said stamping face onto said edge margin of said panel and continuing said moving of said step b) so that said edge-folding tool folds back and compresses said edge margin of said panel against said mold, without contacting said cutting edge onto said edge margin of said panel;

d) continuing to move said tool holder frame in said linear stamping direction while said edge-folding tool remains stationary as said edge-folding tool body is progressively retracted relative to said tool holder body against said biasing force by a reactive force applied by said mold and said edge margin of said panel against said stamping face;

e) continuing said step d) until said cutting edge contacts and cuts through said edge margin of said panel, while said stamping face of said edge-folding tool continues to compress said edge margin of said panel adjacent to said cutting edge; and f) moving said tool holder frame away from said panel and said mold.

2. The method according to claim 1, wherein said step e) further includes pressing a tapered surface of said cutting blade adjoining said cutting edge against said panel on a side of said cutting edge opposite said stamping face, and thereby compressing said panel with said tapered surface.

3. A combination tool for edge-folding and cutting a rim of a panel, comprising:

a tool holder frame;

a cutting blade that is fixedly secured to said tool holder frame so as to be immovable relative to said tool holder frame, and that includes a blade body and a cutting edge protruding away from said tool holder frame;

an edge-folding tool that is movably mounted to said tool holder frame so as to be linearly slidable relative to said tool holder frame in a linear stamping direction, and that includes an edge-folding tool body and a stamping face protruding away from said tool holder frame proximate to said cutting edge; and a biasing device that is interposed between said tool holder frame and said edge-folding tool to apply a biasing force between said tool holder frame and said edge-folding tool which urges said edge-folding tool to protrude away from said tool holder frame in said linear stamping direction;

wherein said tool holder frame has a receiver chamber therein, at least a portion of said blade body is received and secured in said receiver chamber, a guided end portion of said edge-folding tool body is slidingly received and guided in said receiver chamber, and said biasing device is arranged in said receiver chamber between said edge-folding tool body and an end wall of said tool holder frame bounding said receiver chamber.

4. A method of using the combination tool according to claim 3, to edge-fold and cut a rim of a panel being formed on a mold, comprising the following steps:
   a) positioning said combination tool relative to said mold at an initial position in which said edge-folding tool is maximally protruding from said tool holder frame;
   b) moving said tool holder frame toward an edge margin of said panel and said mold in said linear stamping direction, whereby said cutting blade and said edge-folding tool move with said tool holder frame in said linear stamping direction;
   c) contacting said stamping face onto said edge margin of said panel and continuing said moving of said step b) so that said edge-folding tool folds back and compresses said edge margin of said panel against said mold, without contacting said cutting edge onto said edge margin of said panel;
   d) continuing to move said tool holder frame in said linear stamping direction while said edge-folding tool remains stationary as said edge-folding tool body is progressively retracted relative to said tool holder body against said biasing force by a reactive force applied by said mold and said edge margin of said panel against said stamping face;
   e) continuing said step d) until said cutting edge contacts and cuts through said edge margin of said panel, while said stamping face of said edge-folding tool continues to compress said edge margin of said panel adjacent to said cutting edge; and
   f) moving said tool holder frame away from said panel and said mold.

5. The method according to claim 4, wherein said step e) further includes pressing a tapered surface of said cutting blade adjoining said cutting edge against said panel on a side of said cutting edge opposite said stamping face, and thereby compressing said panel with said tapered surface.

6. The combination tool according to claim 3, wherein said edge-folding tool further includes a guide rod protruding from said guided end portion of said edge-folding tool body, said tool holder frame has a guide bore in said end wall that communicates and extends from said receiver chamber, and said guide rod is slidingly received in said guide bore so as to be slidable therein in said linear stamping direction.

7. The combination tool according to claim 3, wherein said biasing device comprises a mechanical biasing spring.

8. The combination tool according to claim 7, further comprising an adjusting screw that bears on said biasing spring and is adjustable so as to selectively variably prestress said biasing spring and thereby adjust said biasing force.

9. The combination tool according to claim 3, wherein said biasing device comprises a pneumatic or hydraulic piston-cylinder device.

10. The combination tool according to claim 3, wherein said cutting blade is releasably and removably secured to said tool holder frame.

11. The combination tool according to claim 10, further comprising securing screws that releasably and removably secure said cutting blade to said tool holder frame.

12. The combination tool according to claim 3, wherein said edge-folding tool body and said blade body extend in parallel and in sliding contact with each other.

13. The combination tool according to claim 3, wherein said stamping face of said edge-folding tool is positioned farther than said cutting edge of said cutting blade away from said tool holder body when said edge-folding tool is urged by said biasing device into an initial position of maximum protrusion of said edge-folding tool from said tool holder body.

14. The combination tool according to claim 13, wherein said cutting edge of said cutting blade is positioned farther than said stamping face of said edge-folding tool away from said tool holder body when said edge-folding tool is slidingly pushed against said biasing force exerted by said biasing device into a retracted position of said edge-folding tool relative to said tool holder frame.

15. The combination tool according to claim 3, wherein said cutting edge is a one-sided tapered cutting edge formed by an intersection of a flat planar surface of said blade body extending along said linear stamping direction and a taper surface opposite said flat planar surface, with a taper angle of said cutting edge formed between said taper surface and said flat planar surface.

16. The combination tool according to claim 15, wherein said taper angle is in a range from 10° to 35°.

17. The combination tool according to claim 15, wherein said taper angle is 15°.

18. The combination tool according to claim 15, wherein said stamping face extends at a stamping face angle relative to a planar side surface of said edge-folding tool body that extends along said linear stamping direction and that is in sliding contact along said flat planar surface of said blade body, and wherein said taper angle of said cutting edge and said stamping face angle of said edge-folding tool are complementary to each other so as to sum together to 90°.

19. An apparatus comprising said combination tool according to claim 3 and a mold adapted to mold said panel thereon, wherein said mold includes a mold body with a main mold surface on which said panel is molded, an undercut shoulder surface adjoining and being undercut relative to said main mold surface, and a margin compression surface adjoining and extending at an angle from said undercut shoulder surface, and a cutting counter anvil that is inset into said mold body at a junction of said undercut surface and said margin compression surface, wherein said combination tool is arranged and oriented relative to said mold such that said edge-folding tool reaches under said undercut shoulder surface, said stamping face presses a margin of a panel against said margin compression surface and said cutting edge of said cutting blade cuts through the margin of the panel against the cutting counter anvil while pressing the panel against the undercut shoulder surface.

20. A combination tool for edge-folding and cutting a rim of a panel, comprising:
   a tool holder frame;
   a cutting blade that is fixedly secured to said tool holder frame so as to be immovable relative to said tool holder frame, and that includes a blade body and a cutting edge protruding away from said tool holder frame;
   an edge-folding tool that is movably mounted to said tool holder frame so as to be linearly slidable relative to said tool holder frame in a linear stamping direction, and that includes an edge-folding tool body and a stamping face protruding away from said tool holder frame proximate to said cutting edge; and a biasing device that is interposed between said tool holder frame and said edge-folding tool to apply a biasing force between said tool holder frame and said edge-folding tool which urges said edge-folding tool to protrude away from said tool holder frame in said linear stamping direction;

wherein said cutting edge is a one-sided tapered cutting edge formed by an intersection of a flat planar surface of said blade body extending along said linear stamping direction and a taper surface opposite said flat planar surface, with a taper angle of said cutting edge formed between said taper surface and said flat planar surface;

wherein said stamping face extends at a stamping face angle relative to a planar side surface of said edge-folding tool body that extends along said linear stamping direction and that is in sliding contact along said flat planar surface of said blade body; and wherein said taper angle of said cutting edge and said stamping face angle of said edge-folding tool are complementary to each other so as to sum together to 90°.

21. An apparatus comprising a combination tool for edge-folding and cutting a rim of a panel, and a mold adapted to mold said panel thereon, wherein said combination tool comprises:
a tool holder frame;
a cutting blade that is fixedly secured to said tool holder frame so as to be immovable relative to said tool holder frame, and that includes a blade body and a cutting edge protruding away from said tool holder frame;

an edge-folding tool that is movably mounted to said tool holder frame so as to be linearly slidable relative to said tool holder frame in a linear stamping direction, and that includes an edge-folding tool body and a stamping face protruding away from said tool holder frame proximate to said cutting edge; and is a biasing device that is interposed between said tool holder frame and said edge-folding tool to apply a biasing force between said tool holder frame and said edge-folding tool which urges said edge-folding tool to protrude away from said tool holder frame in said linear stamping direction; and wherein said mold comprises:
a mold body with a main mold surface on which said panel is molded, an undercut shoulder surface adjoining and being undercut relative to said main mold surface, and a margin compression surface adjoining and extending at an angle from said undercut shoulder surface; and a cutting counter anvil that is inset into said mold body at a junction of said undercut surface and said margin compression surface; and wherein said combination tool is arranged and oriented relative to said mold such that said edge-folding tool reaches under said undercut shoulder surface, said stamping face presses a margin of said panel against said margin compression surface and said cutting edge of said cutting blade cuts through said margin of said panel against said cutting counter anvil while pressing said panel against said undercut shoulder surface.

* * * * *